United States Patent [19]

Ofstead

[11] 4,020,254
[45] Apr. 26, 1977

[54] METATHESIS POLYMERIZATION OF CYCLOOLEFINS

[75] Inventor: Eilert A. Ofstead, Cuyahoga Falls, Ohio

[73] Assignee: The Goodyear Tire & Rubber Company, Akron, Ohio

[22] Filed: June 20, 1975

[21] Appl. No.: 588,981

Related U.S. Application Data

[63] Continuation-in-part of Ser. No. 510,528, Sept. 30, 1974, abandoned.

[52] U.S. Cl. .......................... 526/128; 252/429 B; 526/283; 526/308
[51] Int. Cl.² .................. C08F 4/72; C08F 32/04
[58] Field of Search .............. 252/429 B; 260/88.2, 260/93.1; 526/128

[56] References Cited

UNITED STATES PATENTS

| | | | |
|---|---|---|---|
| 3,546,133 | 12/1970 | Ziegler et al. | 252/429 |
| 3,546,133 | 12/1970 | Ziegler et al. | 260/94.9 B |
| 3,780,136 | 12/1973 | Khelghatian et al. | 260/94.9 C |
| 3,857,825 | 12/1974 | Streck et al. | 260/93.1 |
| 3,943,116 | 3/1976 | Bell | 260/30.8 R |

FOREIGN PATENTS OR APPLICATIONS 966,788  8/1964  United Kingdom

*Primary Examiner*—Edward J. Smith
*Attorney, Agent, or Firm*—F. W. Brunner; J. Y. Clowney

[57] ABSTRACT

There is disclosed a new process for ring-opening polymerization of cycloolefins by the use of a catalyst comprising (A) tungsten or molybdenum halides, (B) alkyl aluminum halides and (C) alkoxysilanes. Also the catalyst is disclosed as useful in metathesis of olefins.

7 Claims, No Drawings

METATHESIS POLYMERIZATION OF CYCLOOLEFINS

This application is a continuation-in-part of application Ser. No. 510,528, filed Sept. 30, 1974, now abandoned.

This invention is directed to a process for the ring-opening polymerization of unsaturated alicyclic hydrocarbons. It is also directed to novel catalyst systems useful for this ring-opening polymerization process. These catalyst systems are further useful for the interconversion of acyclic olefins according to the method known as the olefin metathesis reaction (also called the olefin dismutation or olefin disproportionation reaction).

The olefin metathesis reaction is a unique bond reorganization process whereby materials possessing carbon-to-carbon double bonds undergo a cleavage of the double bond which results in a redistribution of constitutents as depicted in the following equation:

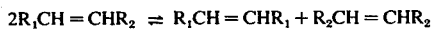

The olefin metathesis reaction, being an equilibrium process, facilitates: (1) obtaining the olefins $R_1CH=CHR_1$ and $R_2CH=CHR_2$ starting from $R_1CH=CHR_2$; or alternatively, (2) obtaining the olefin $R_1CH=CHR_2$ by starting from a mixture of olefins $R_1CH=CHR_1$ and $R_2CH=CHR_2$.

Similarly, the ring-opening polymerization reaction of cycloolefins also involves the scission of the carbon-to-carbon double bonds in the cycloolefin ring. The alkylidene carbons are rejoined to other such carbons derived from other monomer units to form the linear unsaturated polymer chain. Thus, the ring-opening of cyclopentene, for instance, yields a repeat unit:

This repeat unit has also been expressed in the following equivalent forms:

and

More specifically, the novelty of the present invention relates to the use of alkoxysilanes (preferably alkoxytrimethylsilanes) employed as catalyst modifiers for transition-metal/aluminum-alkyl halide catalyzed ring-opening polymerizations. These modifiers can be used to produce catalyst systems which exhibit excellent activity as cycloolefin ring-opening polymerization catalysts. As a result, it is possible to use short reaction times and mild polymerization temperatures. Furthermore, very low catalyst concentrations may be used with excellent results. Thus, good yields of product can be obtained when the molar ratio of transition metal:monomer is as low as 1:10,000 or less.

The process of this invention comprises the ring-opening polymerization or copolymerization of at least one unsaturated alicyclic compound selected from the group consisting of (1) unsaturated alicyclic compounds containing four or five carbon atoms and one double bond in the ring, (2) non-conjugated, unsaturated alicyclic compounds containing at least seven carbon atoms in the ring and at least one double bond in the ring, and (3) polycyclic olefins and diolefins by subjecting said alicyclic compounds or mixtures thereof to polymerization conditions in the presence of a catalyst system comprising (A) a transition metal salt selected from the group consisting of tungsten halides and oxyhalides and molybdenum halides and oxyhalides, (B) at least one compound selected from the group consisting of dialkylaluminum halides, alkylaluminum sesquihalides and alkylaluminum dihalides and (C) at least one compound of the formula RO Si R′$_3$ wherein R is CH$_3$— or Y-CH$_2$CH$_2$—, wherein Y is hydrogen, halogen, nitrile, alkyl containing from 1 to 4 carbon atoms or alkoxy containing from 1 to 4 carbon atoms and where R′ is a methyl or an ethyl radical; and wherein the molar ratios of A/B/C lies within the range of 1/0.5–10/0.5–3.

The desired polymerization of alicyclic olefins results in linear, unsaturated polymers having repeating units derived from opening the ring of the unsaturated alicyclic compounds. It is known that the catalysts useful in this process facilitate the cleavage of carbon-to-carbon double bonds. The resulting halves of molecules, designated alkylidene fragments, then recombine to give the new olefin products. The polymerization catalysts of this invention may be employed to prepare a wide variety of useful polymers having different properties depending upon the particular monomer or combination of monomers chosen to be polymerized, the particular catalyst combination employed and the particular polymerization conditions employed. The linear, unsaturated products resulting from the use of the polymerization catalysts of this invention can be employed in a variety of applications, for example, they may be employed to produce finished rubber articles such as pneumatic tires, molded goods and the like or these materials may be useful in coatings, in adhesives or in the manufacture of articles such as films and fibers.

Representative but not exhaustive of the unsaturated alicyclic monomers described in (1) above are cyclobutene, 3-methylcyclobutene, cyclopentene and 4-methylcyclopentene. Representative of the monomers described in (2) above are cyclodecene, cyclooctene, cyclododecene, 1,5-cyclooctadiene, 1,9-cyclohexadecadiene, 1,5,9-cyclododecatriene, 3-methylcyclooctene, 3- phenylcyclooctene, 1-methyl-1,5-cyclooctadiene, 1-chloro-1,5-cyclooctadiene, 1,2-dimethyl-1,5-cyclooctadiene and the like.

Representative polycyclic olefins and diolefins described in (3) above are 3,3′-bicyclopentene,

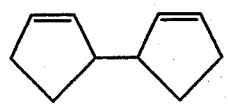

3,3′-bicyclooctene,

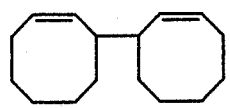

bicyclo[4,3,0]nona-3,7-diene,

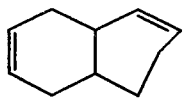

dicyclopentadiene, norbornadiene, norbornene, 5-vinylnorbornene, 5-alkylnorbornene and tricyclo[8,2,1,0²,⁹]trideca-5,11-diene.

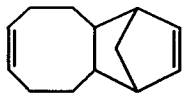

Representative of the organometallic catalyst components in (B) above are diethylaluminum chloride, diisobutyl aluminumchloride, diethylaluminum fluoride, dipropylaluminum bromide, ethylaluminum sesquichloride, methylaluminum sesquibromide, butylaluminum sesquichloride, ethylaluminum dichloride, propylaluminum dichloride, isobutylaluminum dibromide and the like. Of these, it is usually preferred to employ organoaluminum chlorides.

Representative of the compounds useful as the (C) catalyst component of the present invention include methoxytrimethylsilane, ethoxytrimethylsilane, methoxytriethylsilane, butyldimethylethoxysilane, butoxytriethylsilane, 2-chloroethoxytrimethylsilane, 2-bromoethoxytriethylsilane, 2-fluoroethoxytrimethylsilane, 2-cyanoethoxytrimethylsilane, 2-methoxytrimethylsilane, 2-ethoxyethyltrimethylsilane, 2-butoxyethyltriethylsilane and the like.

Representative of the transition metal salts described in (A) are tungsten hexachloride, tungsten hexabromide, tungsten oxytetrachloride, tungsten oxytetrabromide, tungsten oxytetrafluoride, tungsten oxytetraiodide and the like.

The catalyst systems set forth above are prepared by mixing the components by known techniques. Thus, the catalyst systems may be prepared by "preformed" or "in situ" techniques, or by a combination of these techniques. By the "preformed" method, the catalyst components are mixed together prior to exposure of any of these components to the alicyclic monomers to be polymerized. In the in situ method, the catalyst components are added individually to the alicyclic monomers. In the handling and transfer of the catalyst components, it is often convenient to utilize solutions of these components in suitable inert solvents such as benzene, toluene, chlorobenzene, hexane, pentane, cyclopentane and the like.

The order of addition of the catalyst components to each other is of interest in the practice of this invention.

When the in situ method is employed, solely, it is much preferred to add the B component last, but the particular addition of the A and C components is generally not critical. Combinations of in situ and preformed methods can also be used effectively. In this case, it is generally preferred to employ the B component according to the in situ method, while component A may be preformed with component C.

It has been found that when the preformed technique is employed with the catalyst components A and C, some aging of the mixture of the components may be desirable. During this aging period, color changes are usually observed. This aging period may require only a few minutes or it may take several hours. The aging process can be carried out at ambient temperatures in the range of 20°–25° C, or it may be accelerated by the use of moderately elevated temperatures in the range of 30°–100° C.

One particular advantage of the process described herein results from the fact that the reaction of the ROSiR'₃ compounds with the transition metal salts normally avoid the formation of undesirable HCl. This is in contrast with many well known and effective catalyst combinations which utilize so-called modifiers possessing an —OH group, such as alcohols, phenols, carboxylic acids and the like. These combinations normally result in the formation of HCl according to the following scheme:

$$n\text{ROH} + \text{WX}_6 \rightarrow (\text{RO})_n\text{WX}_{6-n} + n\text{HCl} \ (n \leq 3)$$

This HCl is undesirable in the system, especially when catalyst solutions are prepared by the preforming technique wherein the transition metal salt and the modifier are reacted prior to being contacted with the monomer. Because of its corrosive nature, special equipment will be required in order to handle preformed catalyst systems where HCl is formed. In addition, HCl is to be avoided in the polymerization reaction medium because it is capable of reacting with and consuming part of the organoaluminum cocatalysts normally employed, thus reducing its effectiveness and necessitating the use of correspondingly greater amounts of the organoaluminum component for optimum catalyst activity.

Of course, it is possible to remove much of the HCl formed by employing various techniques such as heating the solution or applying a vacuum in order to drive out the HCl, or purging the solution with an inert gas such as nitrogen in order to expel HCl. However, it is preferable to avoid these extra processes if possible. The above difficulties are avoided by the use of alkoxysilanes as catalyst modifiers.

The amount of catalyst employed in the practice of this invention may range over a wide concentration range. Of course, a catalytic amount of the catalyst must be employed but the optimum amount depends upon a number of factors such as the temperature employed, the particular alicyclic monomers employed, the purity of the reaction conditions employed, the reaction time desired, and the like. Generally, it is preferred to use at least about 0.01 parts by weight of the A component per 100 parts by weight of the alicyclic monomer or mixture of monomers.

The operating conditions which are employed in the process of this invention may vary. The polymerization may be carried out in solution or in bulk. When solvents or diluents are employed, they should be chosen so as not to adversely affect the desired polymerization process.

Representative examples of useful solvents are liquid aromatic hydrocarbons such as benzene, toluene and chlorobenzene, aliphatic saturated hydrocarbons such as pentane, hexane, petroleum ether and decane, and alicyclic saturated hydrocarbons such as cyclopentane, cyclohexane, decalin and the like.

The amount of solvent is not critical and may vary from none up to a solvent/cycloolefin weight ratio of 50/1, but more convenient ratios are about 80/20 weight ratios.

Temperature at which the polymerization can be carried out can be varied over a wide range. It is generally preferred to conduct these polymerizations under relatively mild reaction conditions over the range of about $-20°$ C to about $100°$ C.

The polymerization times will vary and can range from less than a minute to 24 hours or more depending upon the polymerization conditions and the extent of polymerization desired. Generally, however, a satisfactory polymerization product is obtained in a matter of only a few minutes or hours.

The polymerization reaction may be carried out as a batch or as a continuous process. In performing the polymerization of this invention, the introduction of the monomer, catalyst and solvent, when a solvent is employed, can each be made to the reaction zone intermittently and/or continuously.

The practice of this invention is further illustrated by reference to the following examples, which are intended to be representative rather than restrictive of the scope of this invention. All manipulations of catalyst preparation and charging premix and catalyst components were conducted under a nitrogen atmosphere. The order of catalyst addition to the polymerization bottles containing premix was tungsten-silane component followed by the organoaluminum component.

EXAMPLE I

The preformed technique was employed to prepare a solution of $WCl_6$ modified with 2-chloroethoxytrimethylsilane at a molar ratio of silane/W = 2/1. The required amount of the silane was added to an 0.05 molar solution of $WCl_6$ in benzene and allowed to react, as indicated by a change in color from deep blue-black to deep red-orange.

A hexane solution containing 178.2 grams per liter (g/l) of cyclopentene was purified by being passed through a mixture of silica gel and alumina, and 40 ml of this solution was charged to a 4-oz reaction bottle and cooled to $0°$ C. To this was added 0.50 ml of the tungsten solution described above, followed by 0.50 ml of an 0.20 molar solution of ethylaluminum dichloride in benzene. The polymerization was terminated after 2 hours with a small amount of ethanol and 0.05 g of di-tert-butyl-p-cresol, and the solution was dried in air at $60°$ C. The yield of solid, rubbery polypentenamer was 4.34 g equivalent to 60.2 percent conversion.

EXAMPLE II

The preformed technique described in Example I was employed to prepare a solution of $WCl_6$ modified with 2-cyanoethoxytrimethylsilane at a molar ratio of silane/W of 2/1, except that the solution was agitated for 24 hours at room temperature before being used. A benzene solution containing 156.5 g/l of cyclopentene was purified as in Example I. To 40 ml of this solution at $0°$ C was added 0.40 ml of the tungsten component, followed by 0.30 ml of an 0.20 molar solution of ethylaluminum dichloride in benzene. The polymerization was terminated after 10 minutes with a small amount of methanol. A yield of 39 percent was obtained of a strong, rubbery polymer having a trans vinylene content of 91 percent as determined by infrared analysis.

EXAMPLE III

The preformed technique described in Example I was employed for the preparation of the modified $WCl_6$ solution, except that the molar ratio of 2-chloroethoxytrimethylsilane/$WCl_6$ was 1/1. A premix was prepared consisting of 1305 g of benzene, 217 g of 1,5-cyclooctadiene, 47.5 g of dicyclopentadiene and 0.13 g of 1-pentene as a molecular weight regulator. This mixture was purified as described in Example I, and 40 ml (5.87 g of monomers, combined) was polymerized at room temperature by the addition of 0.60 ml of the tungsten component, followed by 0.60 ml of an 0.20 molar solution of ethylaluminum dichloride in benzene. The polymerization was terminated after 20 minutes by the addition of ethanol. A yield of 5.58 g or 94.2 percent conversion of a solid, rubbery copolymer was obtained, which had an inherent viscosity in toluene of 0.90, and which contained 5.8 percent of material insoluble in toluene.

EXAMPLE IV

A catalyst solution was prepared by the addition of 2-chloroethoxytrimethylsilane to an 0.05 molar solution of $WCl_6$ in benzene, a molar ratio of silane/W of 1/1, and allowing it to react for about 1 hour, followed by the addition of one molar equivalent of 2-cyanoethoxytrimethylsilane to the mixture. This solution was then agitated for 24 hours at room temperature.

A hexane solution containing 177.5 g/l of cyclopentene was purified as in Example I. To 40 ml of this solution at $10°$ C was added 0.50 ml of the tungsten component, and 0.40 ml of an 0.20 M solution of ethylaluminum dichloride in benzene. The polymerization was terminated after 1 hour by the addition of methanol to give a 66.0 percent yield of rubbery polypentenamer.

EXAMPLES V–IX

A 14.5 percent by weight solution of freshly distilled cyclooctene in toluene was purified as in Example I, and a series of polymerizations were carried out at about $23°$ C using 42.2 g quantities of this solution charged to 4-oz glass bottles. In Examples V, VI and VIII of Table 1, 3 microliters of 1-pentene were added as a molecular weight regulator. The preformed modified tungsten catalyst solutions were prepared as in Example I. Polymerizations were initiated by the addition of the required amount of the tungsten catalyst solution, followed by the organoaluminum component. Results and conditions of these experiments are shown in Table 1.

TABLE 1

| Example | V | VI | VII | VIII | IX |
|---|---|---|---|---|---|
| Alkoxysilane[a] | D | D | D | D | E |
| Si/W, molar ratio | 1 | 1 | 3 | 1 | 1 |
| Cyclooctene/W, molar ratio x$10^{-3}$ | 5.5 | 3.7 | 3.7 | 11.1 | 3.7 |
| Organoaluminum[b] | EADC | EADC | EADC | EASC | EADC |
| Al/W, atomic ratio | 2 | 3 | 3 | 4 | 3 |
| Time, minutes | 2 | 7 | 7 | 3 | 7 |
| Polymer yield, g | 4.41 | 5.90 | 4.40 | 2.42 | 5.53 |

TABLE 1-continued

| Example | V | VI | VII | VIII | IX |
|---|---|---|---|---|---|
| Conversion % | 71.1 | 95.4 | 71.0 | 38.7 | 89.4 |

$^a$ D is $C_2H_5OSi(CH_3)_3$ ; E is $C_2H_5OC_2H_4OSi(CH_3)_3$
$^b$ EADC is $C_2H_5AlCl_2$; EASC is $(C_2H_5)_3Al_2Cl_3$

While certain representative embodiments and details have been shown for the purpose of illustrating the invention, it will be apparent to those skilled in this art that various changes and modifications may be made therein without departing from the spirit or scope of the invention.

What is claimed is:

1. A cycloolefin methathesis polymerization process comprising contacting at least one unsaturated alicyclic compound selected from the group consisting of (1) unsaturated alicyclic compounds containing five carbon atoms in the ring and containing one double bond in the ring, (2) non-conjugated unsaturated alicyclic compounds containing at least seven carbon atoms in the ring and at least one double bond in the ring, and (3) polycyclic olefins and diolefins, by subjecting said alicyclic compounds or mixtures thereof to a catalyst system comprising (A) at least one transition metal salt selected from the group consisting of tungsten halides and tungsten oxyhalides, (B) at least one compound selected from the group consisting of dialkylaluminum halides, alkylaluminum sesquihalides and alkylaluminum dihalides, and (C) at least one compound of the formula $RO Si R'_3$ wherein R is $CH_3-$ or $Y-CH_2CH_2-$, wherein Y is hydrogen, halogen, nitrile, alkyl containing from 1 to 4 carbon atoms or alkoxy containing from 1 to 4 carbon atoms and where R' is a methyl or ethyl radical and where the molar ratios of A/B/C is within the range of 1/0.5–10/0.5–3.

2. A process of claim 1 wherein the $ROSiR'_3$ component is selected from the group consisting of $CH_3O-Si(CH_3)_3$ and $Y-CH_2CH_2OSi(CH_3)_3$ wherein Y— is hydrogen, chlorine, nitrile, methyl, ethyl, methoxy or ethoxy.

3. A process of claim 2 wherein (A) is $WCl_6$.

4. A process according to claim 1 wherein the alicyclic compounds are selected from the group consisting of cyclopentene, cyclooctene, 1,5-cyclooctadiene and dicyclopentadiene.

5. A process according to claim 3 wherein the alicyclic compounds are selected from the group consisting of cyclopentene, cyclooctene, 1,5-cyclooctadiene and dicyclopentadiene.

6. A process according to claim 1 wherein cyclopentene is polymerized.

7. A process according to claim 5 wherein cyclopentene is polymerized.

* * * * *